United States Patent [19]

Pistilli

[11] Patent Number: 5,539,820

[45] Date of Patent: Jul. 23, 1996

[54] PROTECTION OF ACTIVE TELEPHONE LINE INTERFACE CIRCUITS

[75] Inventor: Antonio Pistilli, Stittsville, Canada

[73] Assignee: Northern Telecom Limited, Montreal, Canada

[21] Appl. No.: 318,931

[22] Filed: Oct. 6, 1994

[51] Int. Cl.⁶ .................................................. H04M 1/700
[52] U.S. Cl. ........................ 379/412; 379/377; 379/378; 379/385; 379/399; 361/18; 361/118; 361/119
[58] Field of Search .................................. 379/412, 399, 379/377, 378, 385; 361/118, 119, 18

[56] References Cited

U.S. PATENT DOCUMENTS

| | | | |
|---|---|---|---|
| 4,015,171 | 3/1977 | Miller | 361/18 |
| 4,440,980 | 4/1984 | Bakker | 179/81 |
| 4,661,878 | 4/1987 | Brown et al. | 361/56 |
| 4,849,846 | 7/1989 | Hang et al. | 361/56 |
| 4,947,427 | 8/1990 | Rosch et al. | 379/412 |
| 5,095,261 | 3/1992 | Schoffs | 323/272 |
| 5,103,387 | 4/1992 | Rosenbaum et al. | 363/21 |
| 5,274,702 | 12/1993 | Rosch et al. | 379/399 |
| 5,323,461 | 6/1994 | Rosenbaum et al. | 379/399 |
| 5,333,196 | 7/1994 | Jakeb | 379/413 |

FOREIGN PATENT DOCUMENTS

| | | | |
|---|---|---|---|
| 029169 | 11/1988 | European Pat. Off. | |
| 2555004 | 5/1985 | France | 379/412 |
| 3928743 | 3/1991 | Germany | 379/412 |

OTHER PUBLICATIONS

Application Note—"SLICs Protection Circuits" (AN297/01/89), W. Rossi et al., SGS–Thomson Microelectronics Line Card ICS Databook—1st Edition, Oct. 89, pp. 849–853, para.4.

"Telephone Exchange Primary Protection Development towards Silicon Structures", R. Pezzani et al., L'Onde Electrique, vol. 73, No. 5, Sep. 93, pp. 55–60, XP000396444.

*Primary Examiner*—Jeffery Hofsass
*Assistant Examiner*—Gloria Tebcherani
*Attorney, Agent, or Firm*—R. John Haley

[57] ABSTRACT

A telephone line interface circuit with d.c. amplifiers coupled to tip and ring paths is protected against transient voltages by a crowbar-type protection device coupled via a diode bridge to the tip and ring paths, positive and negative terminals of the diode bridge being connected respectively to ground and via a diode to a negative supply voltage line for the amplifiers. The diode prevents discharge of a capacitor, coupled between the negative supply voltage line and ground, through the protection device when it conducts. A locked up state, in which the amplifiers maintain holding current to the protection device after a transient voltage, is avoided by further diodes coupled from the negative terminal of the diode bridge to inputs of the amplifiers, or by controlling a current limiter to interrupt current to the capacitor when the diode is reverse biased, so that the capacitor discharges. The current limiter includes a resistance and inductance in series for sensing current, whereby initial charging current for the capacitor is reduced on closing of relay contacts in series with the current limiter, and relay contact deterioration is avoided.

14 Claims, 4 Drawing Sheets

PROTECTION OF ACTIVE TELEPHONE LINE INTERFACE CIRCUITS

This invention relates to telephone line interface circuits, and is particularly concerned with a telephone line interface circuit which includes an active line drive circuit, and with the protection of the line drive circuit from transient voltages which can occur in normal use of the line interface circuit.

BACKGROUND OF THE INVENTION

Active telephone fine interface circuits, in which the tip and ring wires of a telephone subscriber fine are driven via an active fine drive circuit, are known. This invention is particularly applicable to, but is not in any way limited to, a form of active telephone line interface circuit certain features of which are described in Rosch et al. U.S. Pat. No. 5,274,702 issued Dec. 28, 1993 and entitled "Wideband Telephone Line Interface Circuit" and Rosenbaum et al. U.S. Pat. No. 5,323,461 issued Jun. 21, 1994 and entitled "Telephone Line Interface Circuit With Voltage Switching".

As described in these patents, in a telephone subscriber line interface circuit a line drive circuit includes two unity-gain d.c. amplifiers whose outputs are coupled to the tip and ring wires, respectively, of the telephone subscriber fine via a switching circuit and a sensing circuit. The line interface circuit also includes a controlled voltage generator and a control circuit. The sensing circuit serves to monitor a.c. and d.c. conditions on the line and includes a sensing transformer and series resistors which are generally referred to as feed resistors. The switching circuit serves, in association with software control via the control circuit, to interconnect the fine, line drive circuit, controlled voltage generator, and a battery in various configurations to provide for different operating states of the line interface circuit. These states include configurations in which relay contacts connect the outputs of the line drive circuit or the output of the controlled voltage generator selectively to the tip and ting wires of the line, and in which relay contacts and an electronic switch selectively connect the output of the controlled voltage generator or the battery as a supply voltage for the fine drive circuit.

It is desirable for the software control of the controlled voltage generator and the switching circuit to be such that switching operations to close relay contacts only take place at times when there are insignificant voltage differences across the relay contacts, so that high current flow on switching, and consequent damage to the relay contacts, is avoided. In practice, however, the desire for relatively rapid switching operations, and especially the inductive and generally unknown nature of the telephone subscriber line to which the line interface circuit is connected, result in conditions in which substantial voltage differences can exist across the closing relay contacts. In consequence, there can be a temporary high current flow which damages the relay contacts.

It is also well known to protect the line drive circuit in an active subscriber line interface circuit from high transient voltages due to lightning, a.c. surges, and inductive coupling. To this end, it is known to couple a diode bridge to points between the outputs of the line drive circuit and the feed resistors, for clamping positive transient voltages to ground and for clamping negative transient voltages to a breakdown voltage of a transient voltage suppressor which is connected between a negative supply voltage and ground. In order to provide sufficient power dissipation for negative transient voltages, it has been necessary to use several transient voltage suppression diodes (frequently referred to by the trade name TRANZORB or TRANSIL) in combination. This has the disadvantages of incurring a relatively high cost and requiring a relatively large physical space.

It would be desirable to be able to replace the several transient voltage suppression diodes by a single crowbar-type protection device, frequently referred to by the trade name TRISIL or SIDAC. However, such a device has the disadvantage that, if used in an active line interface circuit, the current supplied by the line drive circuit can be sufficient to maintain the protection device operative at and after the end of a negative transient voltage, resulting in a locked up state of the line interface circuit.

For the avoidance of any doubt, it is observed here that the TRANZORB and TRANSIL type of transient voltage suppression diodes are avalanche diodes which are specially designed to clamp excessive voltages (i.e. they provide a voltage clamping function) and to dissipate high transient power. In this specification they are referred to as transient voltage suppressors, and they are illustrated in the drawings in the same manner as zener diodes. In contrast, the TRISIL or SIDAC crowbar-type protection device has an electrical characteristic similar to that of a triac but with an internal triggering mechanism; it provides a very high impedance or open circuit for voltages up to a breakover voltage, and then provides a low impedance or short circuit as long as a holding current is maintained. In this specification this device is referred to as a crowbar-type protection device, and is illustrated in the drawings in the same manner as a triac but with a breakover bar instead of a trigger input.

An object of this invention is to provide an improved telephone line interface circuit in which the above disadvantages of the prior art are reduced or avoided.

SUMMARY OF THE INVENTION

According to one aspect of this invention there is provided a telephone line interface circuit comprising: two amplifiers having outputs coupled via tip and ring paths to tip and ring terminals, respectively, for connection to a two-wire telephone line; a diode bridge having two a.c. terminals coupled to the tip and ring paths, respectively, a positive d.c. terminal coupled to ground, and a negative d.c. terminal; a crowbar-type protection device coupled between the negative d.c. terminal of the diode bridge and ground, responsive to a negative transient voltage at the negative d.c. terminal of the diode bridge exceeding a threshold level to short the transient voltage to ground; a negative supply voltage line for the amplifiers; a capacitor coupled between the negative supply voltage line and ground; a diode coupled between the negative supply voltage line and the negative d.c. terminal of the diode bridge with a polarity such that the diode is reverse biased when the protection device shorts said negative transient voltage to ground; and circuitry responsive to the short of the negative transient voltage to ground for reducing current supplied by the amplifiers to below a holding current for maintaining the short by the protection device.

In one embodiment of the invention, the two amplifiers comprise d.c. amplifiers and the circuitry for reducing current supplied by the amplifiers comprises two diodes, each connected between the negative d.c. terminal of the diode bridge and a non-inverting input of a respective one of the amplifiers with a polarity to conduct when the protection device shorts the negative transient voltage to ground.

In another embodiment of the invention, the circuitry for reducing current supplied by the amplifiers comprises a circuit for reducing current supplied to the negative voltage supply line so that the capacitor discharges. The telephone line interface circuit can further include a switching circuit including relay contacts for switching a supply voltage to the negative supply voltage line for charging the capacitor; and a current limiting circuit in series with the relay contacts for limiting charging current to the capacitor when the relay contacts close; in this case preferably the circuit for reducing current supplied by the amplifiers comprises a circuit for controlling the current limiting circuit.

In a preferred form, the current limiting circuit comprises: a current sensor and a controlled path of a transistor connected in series with the relay contacts for supplying charging current to the capacitor; and a control circuit responsive to voltage dropped across the current sensor for controlling the transistor to limit current through the controlled path of the transistor; and the circuit for controlling the current limiting circuit is responsive to reverse biasing of the diode to control the control circuit to substantially eliminate current through the controlled path of the transistor.

The current sensor preferably comprises a resistance and an inductance in series. On closing of the relay contacts, the presence of the inductance not only reduces an initial current for charging the capacitor, but also increases the voltage dropped by the current sensor so that a turn-on delay of the current limiting circuit is reduced. Deterioration of the relay contacts, which can otherwise occur due to the high charging current immediately on closing of the contacts, is thereby avoided.

Thus according to another aspect this invention provides a telephone line interface circuit comprising a capacitor for smoothing a supply voltage, relay contacts via which the capacitor is charged to the supply voltage, and a current limiting circuit connected in series with the relay contacts for limiting charging current to the capacitor on closing of the relay contacts, the current limiting circuit comprising: a current sensor and a controlled path of a transistor connected in series with the relay contacts for supplying charging current to the capacitor; and a control circuit responsive to voltage dropped across the current sensor for controlling the transistor to limit current through the controlled path of the transistor; wherein the current sensor comprises a resistance and an inductance in series.

The telephone line interface circuit as recited above preferably further includes a diode and a crowbar-type protection device connected in series with one another and in parallel with the capacitor, the diode having a polarity such that it is reverse biased when the capacitor is charged and the crowbar-type protection device is conductive whereby the capacitor is not discharged via the crowbar-type protection device, and a circuit responsive to reverse biasing of the diode to control the control circuit to substantially eliminate current through the controlled path of the transistor.

Preferably the transistor comprises a field effect transistor (FET) having a gate and a source-drain path constituting the controlled path, and the control circuit comprises a bipolar transistor having a base-emitter junction responsive to the voltage dropped across the current sensor and a collector coupled to the gate of the FET and via a resistance to a point of common potential. The circuit responsive to reverse biasing of the diode conveniently comprises a second bipolar transistor having a base-emitter junction coupled in parallel with the diode, and a collector coupled to the base of the bipolar transistor of the control circuit.

According to a further aspect this invention provides a circuit for supplying current to a capacitor, comprising relay contacts and a current limiting circuit connected in series, the current limiting circuit comprising: a current sensor and a controlled path of a transistor connected in series with the relay contacts for supplying current to the capacitor; and a control circuit responsive to voltage dropped across the current sensor for controlling the transistor to limit current through the controlled path of the transistor; wherein the current sensor comprises a resistance and an inductance in series.

BRIEF DESCRIPTION OF THE DRAWINGS

The invention will be further understood from the following description with reference to the accompanying drawings, in which.

DETAILED DESCRIPTION

Figure 1:
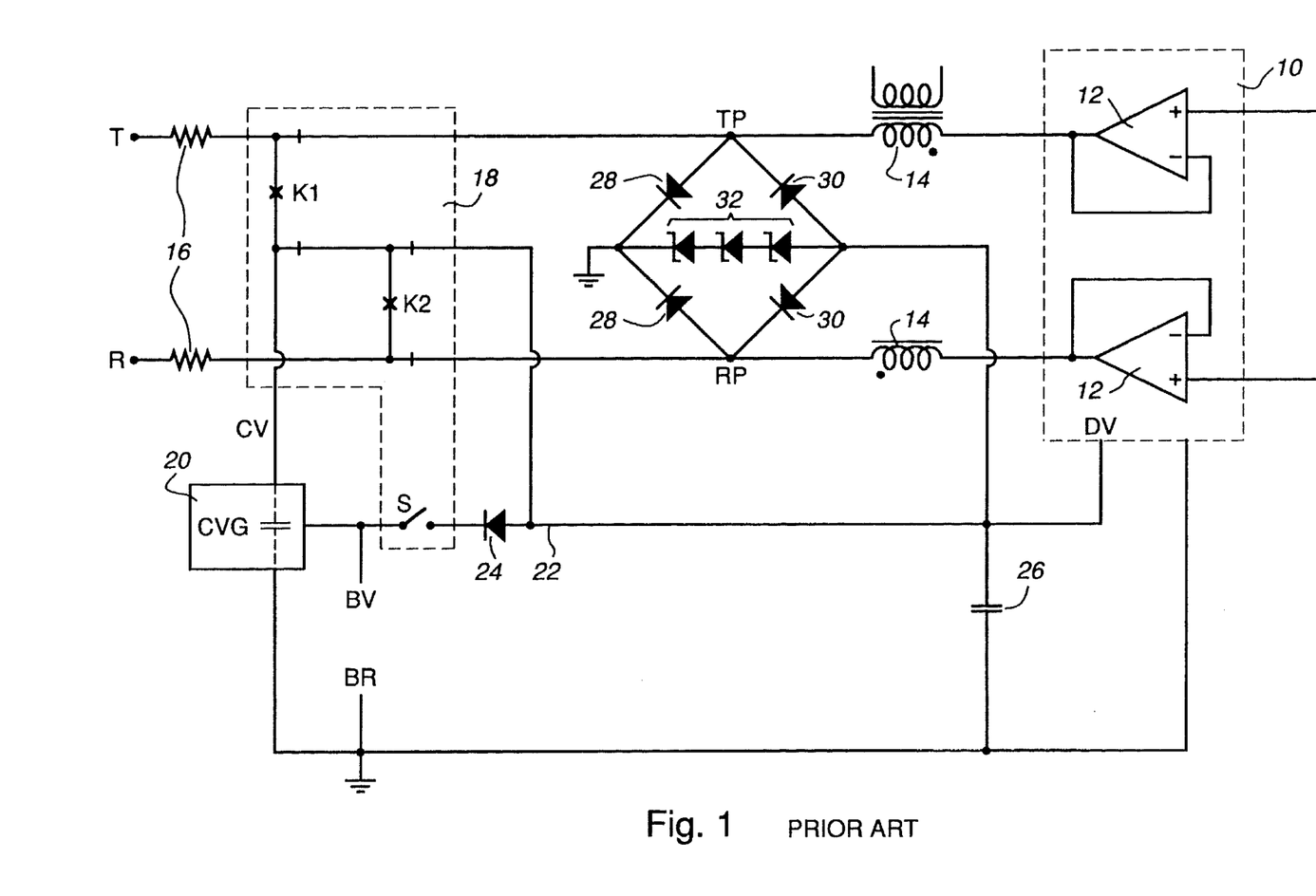
FIG. 1 is a schematic diagram illustrating relevant parts of a known form of telephone line interface circuit.

Referring to FIG. 1, there is illustrated a schematic diagram showing parts of an active telephone line interface circuit, which is assumed in the following description to form part of and be located at a telephone central office (not shown), or CO, but which may alternatively form part of a remote terminal which is coupled to a CO via a multiplexed communications path. Only those parts of the line interface circuit which are relevant to a full understanding of this invention are shown in FIG. 1.

The line interface circuit comprises a line drive circuit 10 which comprises two unity-gain d.c. amplifiers 12 shown within a broken line box. The outputs of the amplifiers 12 constitute outputs of the line drive circuit 10 and are coupled to terminals T and R, for connection respectively to the tip and ring wires of a two-wire telephone subscriber line (not shown), via transformer windings 14 and feed resistors 16 of a sensing circuit which is not otherwise shown, and via a switching circuit 18 which includes an electronic switch S and relay contacts K1 and K2 of two latching relays. The line interface circuit also includes a controlled voltage generator (CVG) 20 which is supplied from a CO battery voltage BV (for example −48 volts) and battery return line BR, at zero volts or ground potential, to produce a controlled voltage CV under the control of a digital control circuit which is not shown. The control circuit also controls the operation of the switching circuit 18 and d.c. voltages supplied to inputs of the line drive circuit 10, coupled to non-inverting (+) inputs of the amplifiers 12, for determining d.c. output voltages of the amplifiers 12.

Further details of the line drive circuit 10, the sensing circuit, the switching circuit 18, the control circuit, and the operation of these are contained in U.S. Pats. Nos. 5,274,702 and 5,323,461 already referred to. The CVG 20 can be as further described in Rosenbaum et al. U.S. Pat. No. 5,103,387 issued Apr. 7, 1992 and entitled "High Voltage Converter". This generator includes an output capacitor which is illustrated in FIG. 1 within the box representing the CVG 20, with connections shown by broken lines between the output for the controlled voltage CV and ground.

The relay contacts K1 and K2 are shown in a reset state of the relays having one open contact (represented by an X) and two closed contacts (each represented by a vertical bar), one of which is in the path from the output of a respective amplifier 12 to the respective terminal T or R, and the other of which is in a series path from the output of the CVG 20 to a line 22 for supplying the line drive circuit 10 with a supply voltage DV. In this state the switch S, which is connected in series with a diode 24 between the battery voltage BV and the supply line 22, is open, and the CVG 20 is controlled to generate the controlled voltage CV to constitute the line drive circuit supply voltage DV. The diode 24 serves to prevent contention between the voltages CV and BV.

In another operating state, the CVG 20 is controlled to be inactive, so that its output presents a high impedance, and the switch S is closed so that the bauery voltage BV is connected to the line 22 to constitute the line drive circuit supply voltage DV. Other operating states of the switching circuit 18 and the CVG 20 serve for example to supply ringing or other high signalling voltages generated by the CVG 20 to the terminal T or R, one of the relays being set accordingly to change the states of the contacts K1 or K2.

As also illustrated in FIG. 1, the supply voltage DV for the line drive circuit 10 is smoothed by a capacitor 26, having a capacitance for example of 1μF and being connected between the line 22 and ground. Furthermore, the line interface circuit includes a diode bridge formed by two dimes 28 and two diodes 30, and three transient voltage suppressors which are connected in series with one another and are collectively referenced 32. The diode bridge has a.c. terminals connected to points TP and RP, between the switching circuit 18 and the transformer windings 14 in the transmit and receive paths from the outputs of the amplifiers 12 to the terminals T and R respectively. A positive d.c. terminal of the diode bridge is connected to ground, and a negative d.c. terminal of the diode bridge is connected to the line 22. The transient voltage suppressors 32 are connected between the d.c. terminals of the diode bridge.

In normal operation, the line drive circuit 10 is controlled by the control circuit so that the output of the amplifier 12 which is coupled to the tip wire terminal T has a slightly negative voltage with respect to ground, for example −5 volts, and so that the output of the amplifier 12 which is coupled to the ring wire terminal R has a slightly positive voltage with respect to the supply voltage DV, for example −45 volts when the supply voltage DV is −50 volts. In the event of a lightning strike on the telephone line or a fault condition producing a positive transient voltage at one or both of the points TP and RP, current (limited by the feed resistors 16) is conducted to ground via one or both of the diodes 28. In the event of a lightning strike on the telephone line or a fault condition producing an excessive negative transient voltage at one or both of the points TP and RP, current (limited by the feed resistors 16) is conducted to the negative voltage supply line 22 via one or both of the diodes 30. The maximum negative voltage of this line 22 is limited to the breakdown voltage of the transient voltage suppressors 32; for example this can be about −64 volts.

In the line interface circuit as described above, in order to provide the supply voltage DV for the line drive circuit 10 from the controlled voltage CV, which for example may be up to −56 volts, the capacitor 26 is charged upon closing of the relay contacts K1 and K2 in the path from CV to DV. In the absence of a current limiter in this path, the initial charging current can be very high, for example about 20 Amps. This high current being switched by the relay contacts K1 and K2 can cause deterioration of the relay contacts and consequent unreliability due to sticking contacts. This problem can be exacerbated by the inductive nature of the telephone subscriber line to which the output of the CVG 20 may just previously have been connected via the relay contacts K1 and K2, which in conjunction with the output capacitor of the CVG 20 may cause the controlled voltage CV to be at a relatively uncontrolled level.

A potential solution to this problem is to provide a current limiter in the line 22. However, the deterioration of the relay contacts is caused by the current surge which flows within a few microseconds from initial closing of the relay contacts, and typical current limiters do not respond sufficiently quickly to limit this surge current.

Figure 2:
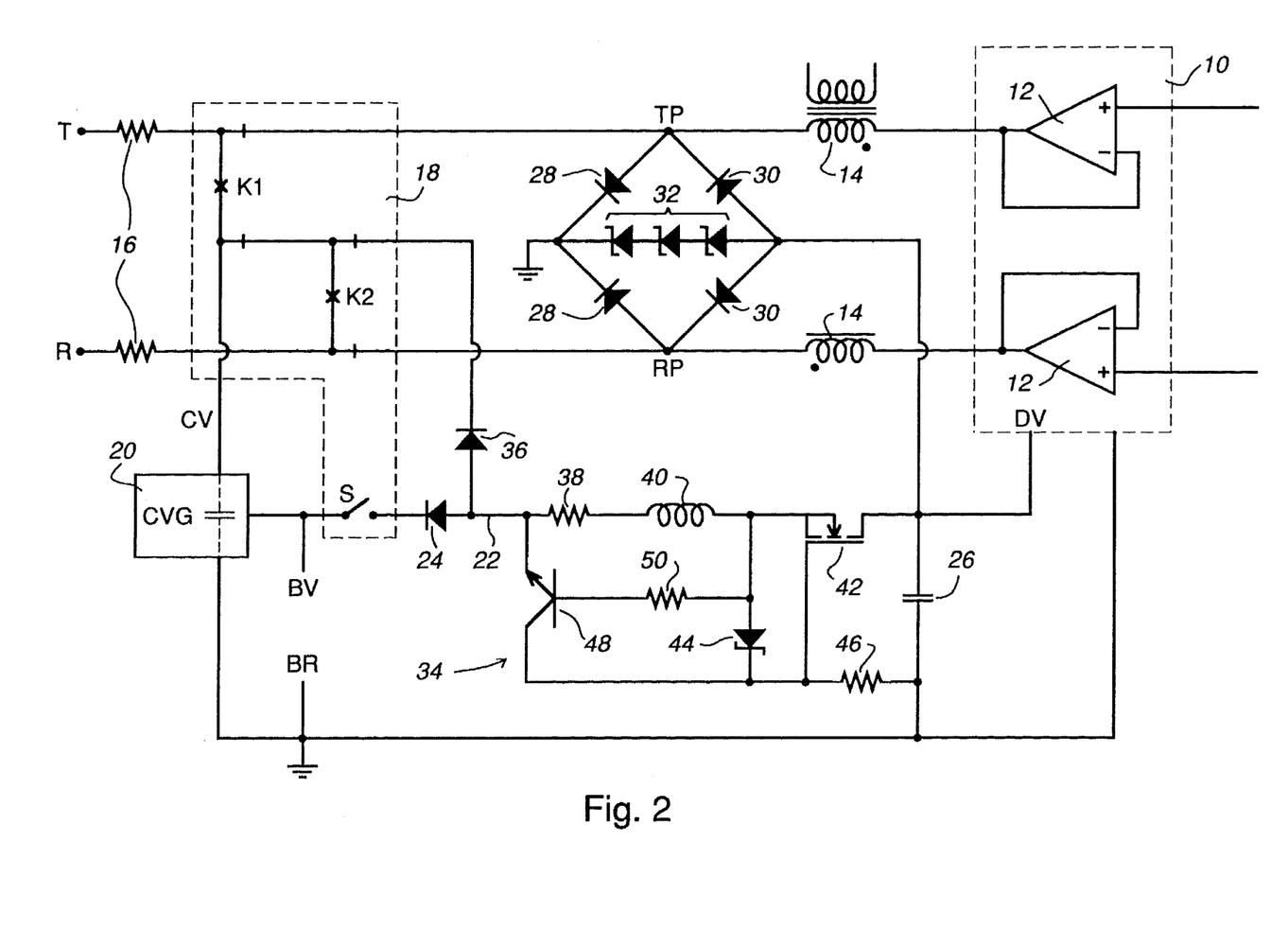
FIG. 2 is a similar schematic diagram illustrating the telephone line interface circuit including a current limiting circuit in accordance with one embodiment of this invention.

FIG. 2 illustrates the same line interface circuit as FIG. 1, with an additional current limiting circuit 34 provided in the line 22 to the capacitor 26, this current limiting circuit 34 being designed specifically for limiting the initial current surge which can cause deterioration of relay contacts as described above. The line interface circuit of FIG. 2 also includes a diode 36 in the switched path between the controlled voltage CV and the current limiting circuit 34. The diodes 24 and 36 prevent reverse biasing of the current limiting circuit 34 when a negative transient voltage causes the supply voltage DV to become more negative than the voltages BV and CV, respectively.

The current limiting circuit 34 includes a resistor 38, an inductor 40, and the source-drain path of a MOSFET 42 connected in series in the line 22. A zener diode 44 is connected in parallel with the gate-source path of the MOSFET 42, with a polarity to limit the gate-source voltage to less than a maximum permitted level for the MOSFET, and a resistor 46 is connected between the gate and ground. An NPN bipolar transistor 48 has its emitter connected to the incoming (most negative part of the) line 22 and its base connected via a current-limiting resistor 50 to the source of the MOSFET 42, so that the series-connected resistor 38 and inductor 40 are in parallel with the resistor 50 and base-emitter junction of the transistor 48. The collector of the transistor 48 is connected to the junction between the gate of the MOSFET 42, the zener diode 44, and the resistor 46.

The current limiting circuit 34 is of known form except for the inclusion of the inductor 40. Assuming for the moment that the inductor 40 is not present, the current limiting circuit operates in the following manner. A negative voltage supplied to the incoming line 22, and hence to the junction between the resistor 38 and the emitter of the transistor 48, acts via the resistors 38 and 46 to provide a gate-source voltage for the MOSFET 42, limited by the zener diode 44, to cause the MOSFET to conduct current via its source-drain path. This current flows via the resistor 38, thereby forward biasing the base-emitter junction of the transistor 48 and causing collector-emitter current to flow via the resistor 46. This current flow increases the voltage drop across the resistor 46, thereby decreasing the gate-source voltage of the MOSFET 42 and limiting its source-drain current.

As described above, the current limiting circuit does not respond sufficiently quickly, due to the turn-on delay of the transistor 48, to limit the current surge which flows on initial closing of the relay contacts K1 and K2 to supply the negative voltage to the line 22 for charging the capacitor 26. Consequently, it is insufficient to prevent deterioration of the relay contacts. The inclusion of the inductor 40 in series with the resistor 38 overcomes this disadvantage.

More specifically, a first effect of the inductor 40 is that its inductance limits the initial current surge on closing of the relay contacts, thereby directly reducing the charging current which flows on closing of the relay contacts. A second effect of the inductor 40 is that the current which flows through it induces a voltage across the inductor which increases the forward bias applied to the base-emitter junction of the transistor 48, thereby considerably reducing the ram-on delay of this transistor, so that the current limiting effect of the circuit 34 is brought into action much more quickly. These two effects of the inductor 40 substantially eliminate the problem of deterioration of the relay contacts.

The line interface circuits of FIGS. 1 and 2 have the disadvantage of requiring three transient voltage suppressors 32 in order to provide the necessary power and voltage characteristics for suppression of negative transient voltages at the points TP and RP. For example, these three transient voltage suppressors may comprise two devices of type 1.5KE27A and one device of type P6KE10A, all available from SGS-Thomson Microelectronics, having nominal breakdown voltages of 27 volts and 10 volts respectively so that the three devices in series provide a breakdown voltage of −64 volts. As explained in the background of the invention, the need for three devices has the disadvantages of resulting in increased cost and space requirements, both of which are significant factors for subscriber line interface circuits.

As also explained in the background of the invention, it would be desirable to be able to replace the three transient voltage suppressors 32 by a crowbar-type protection device, for which a single device can potentially be used because the short-circuit function provided by such a device when triggered means that power dissipation requirements are reduced. However, this is offset by the fact that triggering such a device would suddenly discharge the capacitor 26, and hence the device would also have to handle the discharge current of this capacitor. Additionally, the use of a crowbar-type protection device involves a problem in that the device continues to conduct at and after the end of a negative transient voltage if its holding current is maintained. If the supply voltage DV for the line drive circuit is maintained upon triggering of the device, then the current supplied by the line drive circuit 10 can exceed this holding current, resulting in a locked up state of the line interface circuit.

Figure 3:
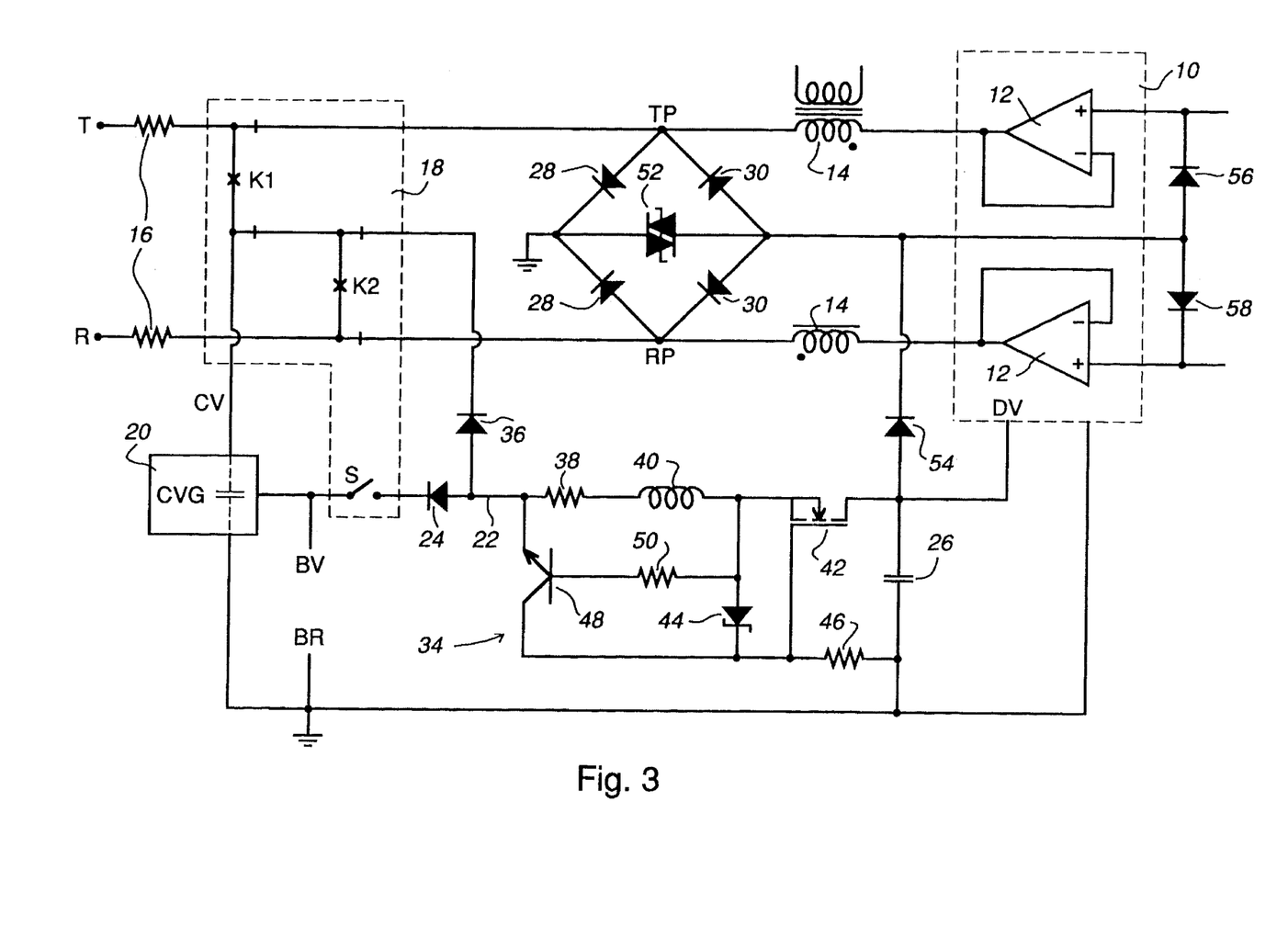
FIGS. 3 and 4 are similar schematic diagrams illustrating modified forms of the telephone line interface circuit in accordance with other embodiments of this invention.

FIG. 3 illustrates the line interface circuit of FIG. 2 but modified in accordance with an embodiment of this invention to replace the three transient voltage suppressors 32 by a single crowbar-type protection device 52 thereby avoiding the increased costs and space requirements of the three devices 32 as discussed above. The problems involved in this replacement as described above are avoided in the line interface circuit of FIG. 3 by the provision of three diodes 54, 56, and 58 as described below.

Referring to FIG. 3, the diode 54 is connected in the path between the negative d.c. terminal of the diode bridge and the supply voltage DV for the line drive circuit 10, with a polarity such that it is reverse biased when the negative d.c. terminal of the diode bridge is more positive than the supply voltage DV. In the event of a sufficient negative transient voltage at the points TP and/or RP, the diode 54 and one or both of the diodes 30 are forward biased so that the output voltages of the amplifiers 12 do not become more negative than the supply voltage DV to the line drive circuit 10 by more than two diode voltage drops; this prevents damage to the line drive circuit 10. On conduction of the crowbar-type protection device 52 in response to a negative transient voltage, the negative d.c. terminal of the diode bridge has a voltage of about −2 volts. The diode 54 is then reverse biased, so that the capacitor 26 is not discharged through the device 52.

Consequently, the device 52 does not need to handle any discharge current from the capacitor 26. However, this means that the line drive circuit 10 remains powered. Unless otherwise prevented, a result of this is that at and after the end of the transient voltage the protection device 52 would remain conducting because its holding current, typically of the order of 150 mA, continues to be supplied by one or both of the amplifiers 12 of the line drive circuit 10, these amplifiers being driven towards their desired output voltages (e.g. −5 and −45 volts) for normal operation as described above.

This is avoided in the line interface circuit of FIG. 3 by connecting the diodes 56 and 58 each between the negative d.c. terminal of the diode bridge and the non-inverting input of a respective one of the amplifiers 12, with a polarity to be conductive when the crowbar-type protection device 52 has been triggered so that the negative d.c. terminal of the diode bridge has a voltage of about −2 volts. Because the amplifiers 12 are d.c. amplifiers with unity voltage gain (their outputs being connected to their inverting inputs), their non-inverting inputs are normally at voltages more negative than −2 volts. Consequently, conduction of the crowbar-type protection device 52 in response to a negative transient voltage causes the non-inverting inputs of the amplifiers 12 to be coupled via the diodes 56 and 58 to a voltage of about −2 volts, and the outputs of the amplifiers 12 are similarly driven to this voltage. Voltage differences between the outputs of the amplifiers 12 and the negative d.c. terminal of the diode bridge are therefore substantially eliminated, and there is consequently little current flow from the line drive circuit 10 to the crowbar-type protection device 52. As a result, the holding current of the device 52 is not maintained beyond the end of the transient voltage, the device 52 ceases to conduct, and a locked up state of the line interface circuit is avoided.

By way of example, it is observed that the crowbar-type protection device 52 can conveniently be a device type TPA62B available from SGS-Thomson Microelectronics. This has a nominal breakover voltage of 62 volts. In this respect it is noted that the presence of the diode 54 enables the breakover voltage of the crowbar-type protection device 52 to be less than the magnitude of the supply voltage DV, provided that it is still greater than the maximum magnitude of voltage which can be produced at the outputs of the amplifiers 12. Thus the magnitude of the supply voltage DV can be increased if desired.

In the line interface circuit of FIG. 3, the diodes 56 and 58 are required to have low cost, low forward voltage drop, rapid response, and low parasitic capacitance in order for them not to detract from wideband (e.g. ISDN) signals which can be supplied to the non-inverting inputs of the amplifiers 12. In consequence, selection of appropriate devices for use as the diodes 56 and 58 may be difficult. This difficulty can be avoided by using an alternative embodiment of the invention which is described below with reference to FIG. 4. This alternative form of the line interface circuit makes use of the current limiting circuit 34 described above. Although the current limiting circuit 34 is also shown in FIG. 3, it should be appreciated that its presence is optional in that line interface circuit.

Figure 4:
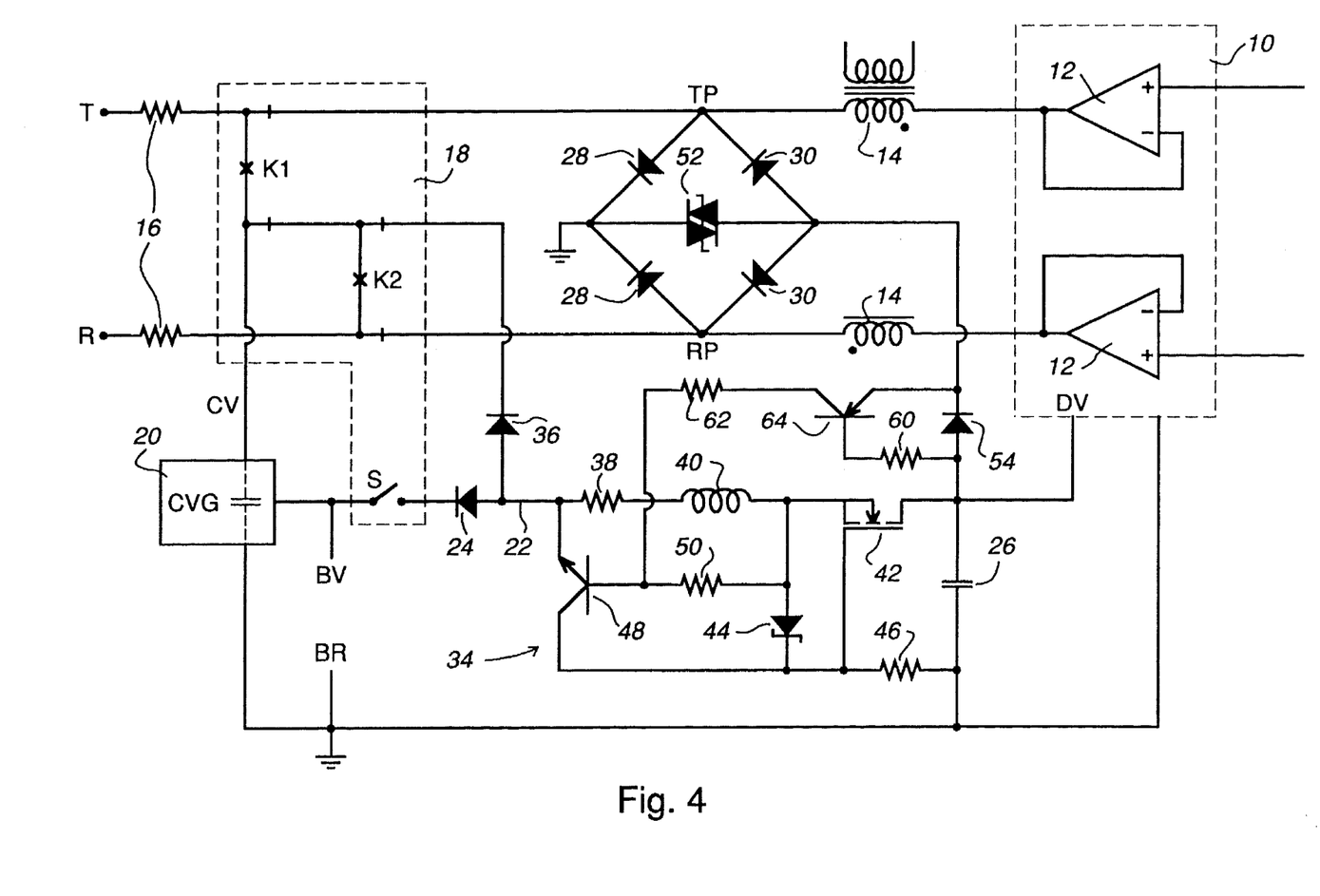

The line interface circuit illustrated in FIG. 4 is the same as that of FIG. 2, with the addition of the diode 54 as described above with reference to FIG. 3, and the addition of two resistors 60 and 62 and a PNP bipolar transistor 64 instead of the diodes 56 and 58 of FIG. 3. The transistor 64 has its emitter connected to the negative d.c. terminal of the diode bridge and its base connected via the resistor 60, which serves to limit base current, to the supply voltage line to the line drive circuit 10. Thus the resistor 60 and base-emitter junction of the transistor 64 are connected in parallel with the diode 54 with a polarity to forward bias the base-emitter junction of the transistor when the diode 54 is reverse biased. The collector of the transistor 64 is connected via the resistor 62, which serves for limiting collector current, to the base of the transistor 48 of the current limiting circuit.

In operation of the line interface circuit of FIG. 4, a negative transient voltage at one of the points TP and RP results in triggering of the crowbar-type protection device 52 as described above with reference to FIG. 3, the voltage at the negative d.c. terminal of the diode bridge becomes about −2 volts, and the diode 54 is reverse biased so that the capacitor 26 does not discharge through the protection device 52. The base-emitter junction of the transistor 64 is then forward biased so that this transistor conducts, its collector current flowing via the base-emitter junction of the transistor 48. The transistor 48 is consequently fully turned on, its collector current flowing through the resistor 46 reducing the gate-source voltage of the MOSFET 42 to turn off this MOSFET, so that current is no longer supplied via the line 22 to the capacitor 26. The capacitor 26 then discharges into its load constituted by the line drive circuit 10. The gradual removal of the power supply for the line drive circuit 10 means that, very soon after the end of the transient voltage, the amplifiers 12 of this circuit are no longer able to supply the holding current required by the protection device 52 for it to remain conductive, and consequently it turns off. As a result, the diode 54 is no longer reverse biased, the transistor 64 ceases to conduct, and the current limiting circuit 34 again supplies current to the capacitor 26 so that the line drive circuit 10 again becomes fully powered.

Thus the line interface circuits of FIGS. 3 and 4 both enable the crowbar-type protection device 52 to be used and avoid the locked up situation described above. The line interface circuit of FIG. 4 is particularly advantageous in that it makes use of the current limiting circuit 34 which is already provided for other reasons, and avoids any additional connections to the inputs of the amplifiers 12 as in the dime arrangement of FIG. 3, so that wideband signals which can be supplied to these amplifiers are unaffected.

Although particular embodiments of the invention have been described in detail, it should be appreciated that numerous modifications, variations, and adaptations may be made without departing from the scope of the invention as defined in the claims.

What is claimed is:

1. A telephone line interface circuit comprising:
    two amplifiers having outputs coupled via tip and ring paths to tip and ring terminals, respectively, for connection to a two-wire telephone line;
    a diode bridge having two a.c. terminals coupled to the tip and ring paths, respectively, a positive d.c. terminal coupled to ground, and a negative d.c. terminal;
    a crowbar-type protection device coupled between the negative d.c. terminal of the diode bridge and ground, responsive to a negative transient voltage at the negative d.c. terminal of the diode bridge exceeding a threshold level to short the transient voltage to ground;
    a negative supply voltage line for the amplifiers;
    a capacitor coupled between the negative supply voltage line and ground;
    a diode coupled between the negative supply voltage line and the negative d.c. terminal of the diode bridge with a polarity such that the diode is reverse biased when the protection device shorts said negative transient voltage to ground; and
    circuitry responsive to the short of the negative transient voltage to ground for reducing current supplied by the amplifiers to below a holding current for maintaining the short by the protection device.

2. A telephone line interface circuit as claimed in claim 1 wherein the two amplifiers comprise d.c. amplifiers and the circuitry for reducing current supplied by the amplifiers comprises two diodes, each connected between the negative d.c. terminal of the diode bridge and a non-inverting input of a respective one of the amplifiers with a polarity to conduct when the protection device shorts the negative transient voltage to ground.

3. A telephone line interface circuit as claimed in claim 1 wherein the circuitry for reducing current supplied by the amplifiers comprises a circuit for reducing current supplied to the negative voltage supply line so that the capacitor discharges.

4. A telephone line interface circuit as claimed in claim 3 and further including:
    a switching circuit including relay contacts for switching a supply voltage to the negative supply voltage line for charging the capacitor; and
    a current limiting circuit in series with the relay contacts for limiting charging current to the capacitor when the relay contacts close;
    wherein the circuit for reducing current supplied by the amplifiers comprises a circuit for controlling the current limiting circuit.

5. A telephone line interface circuit as claimed in claim 4 wherein the current limiting circuit comprises:
    a current sensor and a controlled path of a transistor connected in series with the relay contacts for supplying charging current to the capacitor; and
    a control circuit responsive to voltage dropped across the current sensor for controlling the transistor to limit current through the controlled path of the transistor;
    and wherein the circuit for controlling the current limiting circuit is responsive to reverse biasing of the diode to control the control circuit to substantially eliminate current through the controlled path of the transistor.

6. A telephone line interface circuit as claimed in claim 5 wherein the current sensor comprises a resistance and an inductance in series.

7. A telephone line interface circuit as claimed in claim 6 wherein the control circuit comprises a further, bipolar, transistor having a base-emitter junction responsive to the voltage dropped across the current sensor and a collector coupled to a control electrode of the transistor having the controlled path.

8. A telephone line interface circuit comprising a capacitor for smoothing a supply voltage, relay contacts via which the capacitor is charged to the supply voltage, and a current limiting circuit connected in series with the relay contacts for limiting charging current to the capacitor on closing of the relay contacts, the current limiting circuit comprising:

a current sensor and a controlled path of a transistor connected in series with the relay contacts for supplying charging current to the capacitor; and a control circuit responsive to voltage dropped across the current sensor for controlling the transistor to limit current through the controlled path of the transistor;

wherein the current sensor comprises a resistance and an inductance in series.

9. A telephone line interface circuit as claimed in claim 8 wherein the transistor comprises a field effect transistor (FET) having a gate and a source-drain path constituting the controlled path, and the control circuit comprises a bipolar transistor having a base-emitter junction responsive to the voltage dropped across the current sensor and a collector coupled to the gate of the FET and via a resistance to a point of common potential.

10. A telephone line interface circuit as claimed in claim 8 and further including a diode and a crowbar-type protection device connected in series with one another and in parallel with the capacitor, the diode having a polarity such that it is reverse biased when the capacitor is charged and the crowbar-type protection device is conductive whereby the capacitor is not discharged via the crowbar-type protection device, and a circuit responsive to reverse biasing of the diode to control the control circuit to substantially eliminate current through the controlled path of the transistor.

11. A telephone line interface circuit as claimed in claim 10 wherein the transistor comprises a field effect transistor (FET) having a gate and a source-drain path constituting the controlled path, and the control circuit comprises a bipolar transistor having a base-emitter junction responsive to the voltage dropped across the current sensor and a collector coupled to the gate of the FET and via a resistance to a point of common potential.

12. A telephone line interface circuit as claimed in claim 11 wherein the circuit responsive to reverse biasing of the diode comprises a second bipolar transistor having a base-emitter junction coupled in parallel with the diode, and a collector coupled to the base of the bipolar transistor of the control circuit.

13. A circuit for supplying current to a capacitor, comprising relay contacts and a current limiting circuit connected in series, the current limiting circuit comprising:

a current sensor and a controlled path of a transistor connected in series with the relay contacts for supplying current to the capacitor; and a control circuit responsive to voltage dropped across the current sensor for controlling the transistor to limit current through the controlled path of the transistor;

wherein the current sensor comprises a resistance and an inductance in series.

14. A circuit as claimed in claim 13 wherein the transistor comprises a field effect transistor (FET) having a gate and a source-drain path constituting the controlled path, and the control circuit comprises a bipolar transistor having a base-emitter junction responsive to the voltage dropped across the current sensor and a collector coupled to the gate of the FET and via a resistance to a point of common potential.

* * * * *